United States Patent Office 3,073,739
Patented Jan. 15, 1963

3,073,739
FUNGITOXIC COMPOSITIONS CONTAINING 9,10-PHENANTHRENEQUINONE OXIMES
Glentworth Lamb, Stamford, and Irene M. Voynick, Trumbull, Conn., assignors to American Cyanamid Company, New York, N.Y., a corporation of Maine
No Drawing. Filed Feb. 28, 1961, Ser. No. 92,149
11 Claims. (Cl. 167—30)

This invention relates to improved fungicidal compositions. More particularly, it relates to new fungicidal compositions containing phenanthrenequinone oximes as the active ingredient. The invention is also concerned with methods for protecting agricultural, organic and related articles from attack by microorganisms.

In the past, available fungicides have not been wholly acceptable, since many do not possess the ability to destroy fungi as well as to inhibit fungi spore germination and control bacteria growth. It is, therefore, an object of the present invention to prepare a fungicidal composition which overcomes this and other drawbacks.

According to the present invention, compositions containing phenanthrenequinone monooximes and dioximes as well as their alkali metal salts have been found to possess unsuual fungicidal and bactericidal properties. These compositions are particularly effective in preventing and retarding fungus growth on plant tissues and other organic matter.

Illustrative phenanthrenequinone mono- and dioximes are: 9,10-phenanthrenequinone monooxime, 9,10-phenanthrenequinone dioxime and the alkali metal salts thereof. Typical alkali metals are: sodium, potassium and lithium salts.

Advantageously, the phenanthrenequinone oxime ingredients are readily synthesized. Methods for their preparation are known in the art. For instance, the preparation of phenanthrenequinone monooxime is illustrated by Goldschmidt in Berichte 16, p. 2178 (1883), and the preparation of phenanthrenequinone dioximes is disclosed by Schmidt and Soell in Berichte 40, p. 2454 (1907).

In general, it is preferred to incorporate the phenanthrenequinone oximes in a variety of suitable carriers or diluents. As one advantage of the invention, the fungicidal compounds are effective in extremely dilute concentrations. Such compositions can be prepared as a solution by dissolving them in a water/acetone or alcohol mixture. They can also be prepared either as a suspension in a suitable non-solvent or as a dust. Suspensions or dispersions of the phenanthrenequinone mono- or dioximes in a carrier, such as water, are quite useful in the treatment of plant foliage. The active compounds may also be conveniently applied to foliage by the aerosol method. In the latter utilization, the active compounds can be directly dissolved in a highly volatile liquid carrier, such as dichlorodifluoromethane, under pressure, or the compound can be dissolved in a lesser volatile solvent, such as benzene, and this solution admixed with a highly volatile liquid aerosol carrier.

Fungicidal dusts may be prepared by mixing the active mono- or dioxime compounds with dusting materials as for example clay, pyrophyllite, pumice, fuller's earth and bentonite. Thus, seed can be protected from soil organisms by incorporating the active oxime compounds into a solid carrier while admixing seeds with the fungicidal composition as by tumbling.

Although a wide weight range of fungicidal compound to inert carrier or diluent and up to 25% may be used, it has been found that a percentage range of from about 0.01% to about 10% of active ingredient, and preferably 1.5% is adquate for most aqueous dispersion preparations. However, in a dust composition, not more than about 5% of active ingredient is satisfactory for most applications.

The composition of the present invention may advantageously contain any compatible commercially available dispersing agent for the fungicidal compounds when they are employed in an aqueous suspension. Illustrative examples of such dispersing or surface active agents include: the fatty acid esters of polyhydric alcohols, the sodium salt of polymerized propyl naphthalene sulfonic acid, as for instance, surface active compounds formed by condensing formaldehyde with propyl naphthalene sodium sulfonate, the alkylaryl polyether alcohols, and the ethylene oxide addition products of the latter. Usually, from one to five parts per hundred parts of fungicide is a good operating range.

While the fungicidal composition of the present invention can be used as a powder or in liquid composition, other active ingredients may be added thereto to prepare a multi-purpose preparation. Such other active ingredients can be added as the carrier per se or, in addition, an inert carrier can also be used. These active ingredients in admixture can be parasiticides, fertilizers and the like. Thus, an effective dose of the phenanthrenequinone oxime compound and an insecticide, such as parathion or malathion, can be employed as a multi-purpose preparation.

The invention will be illustrated in conjunction with the following examples which are to be taken as illustrative only and not by way of limitation. All parts are by weight, unless otherwise noted.

EXAMPLE 1

The in vitro fungitoxity of 9,10-phenanthrenequinone oxime, hereinafter called PQO, is determined using a standard spore germination technique. Test fungi are *Venturia inaequalis* (Cooke) Wint. and *Stemphylium sarcinaeforme* (Cav.) Wiltshire. A standardized spore suspension of each fungus is placed in 50% water-acetone solutions of chemical PQO in a graded concentration series. Percent germination is recorded after twenty-four hours incubation at 75° F. and 100% R.H. Results in terms of concentration necessary to inhibit the germination of 50% of the spores ($ED_{50}$) are recorded in Table I below.

*Table I*

| Test fungus: | $ED_{50}$ (PQO in p.p.m.) |
|---|---|
| *V. inaequalis* | 0.05 |
| *S. sarcinaeforme* | 0.01 |

EXAMPLE 2

The in vitro spectrum of 9,10-phenanthrenequinone oxime (PQO) is determined employing an agar-dilution plate technique. The oxime compound is thoroughly mixed with a nutrient agar medium. The microorganism tested is placed on the medium. Incubation is for three days at 86° F. The results set forth in the table below are recorded as the minimum concentration of PQO which completely inhibits growth of the test organism.

Table II

| Test microorganism: | Min. inhib. concn. (p.p.m.) |
|---|---|
| Bacillus mycoides | 2.5 |
| Fusarium moniliforme | 2.5 |
| Chaetomium globosum | 6.25 |
| Penicillium citrinum | 12.5 |
| Pythium ultimum | 50 |
| Fusarium lycopersici | 50 |
| Rhizoctonia solani | 50 |

EXAMPLE 3

The protective properties of 9,10-phenanthrenequinone oxime (PQO) against apple scab (*V. inaequalis*) and powdery mildew (*Podosphaera leucotricha* [Ell. & Everh.] Salm) are observed in this example.

Apple seedlings (var. McIntosh mother), approximately five inches tall with eight well-developed leaves, are selected for uniformity. Individual plants are hand-atomized to run-off with appropriate PQO solutions in 50/50, acetone/water. After the foliage dried, plants are uniformly inoculated with spores of *V. inaequalis* and *P. leucotricha*. Inoculated plants are incubated for 96 hours at 65° F. and 100% R.H. The data are recorded as follows:

Table III

| PQO Treatment at— | Mean Disease Index [1] (Average of four Treatments) | | Phytotoxicity |
|---|---|---|---|
| | Scab | Powdery Mildew | |
| 600 p.p.m. | 0.0 | 0.0 | None observed |
| 300 p.p.m. | 0.0 | 0.25 | Do |
| 150 p.p.m. | 0.0 | 1.5 | Do |
| 75 p.p.m. | 0.0 | 2.0 | Do |
| Acetone/Water Control | 5.0 | 5.0 | Do |

[1] Disease Index: 0=no lesions; 1=mean of <1 lesion/leaf; 2=1-5/leaf; 3=6-24/leaf; 4=25-50/leaf; and 5=>50/leaf. The disease index for each plant is scored on the three heaviest diseased leaves.

EXAMPLE 4

The eradicative property of 9,10-phenanthrenequinone oxime (PQO) against powdery mildew of apple is evaluated in this example.

Apple seedlings are directly inoculated with *P. leucotricha* and placed in the constant temperature-humidity cabinet before treatment with PQO. Sufficient seedlings for two replicates per treatment were removed after 18 hours' incubation, sprayed with the appropriate concentration of PQO set forth in the table below, returned to the cabinet for 48 hours, and then placed in a greenhouse for symptom development. In addition to the 18-hour after infection treatments, infection periods of 24, 30, and 48 hours were included. Resultant data are recorded in the following table:

Table IV

| Treatment | Mean Disease Index [1] With Infection Periods of— | | | |
|---|---|---|---|---|
| | 18 hours | 24 hours | 30 hours | 48 hours |
| PQO at— | | | | |
| 600 p.p.m. | 0.5 | 0.0 | 0.0 | 0.5 |
| 300 p.p.m. | 1.0 | 1.0 | 2.0 | 0.0 |
| Acetone/Water Control, 50/50 | 5.0 | 5.0 | 5.0 | 5.0 |

[1] Mean Disease Index as defined in Table III above.

EXAMPLE 5

The weathering property of 9,10-phenanthrenequinone oxime is evaluated using scab and powdery mildew of apples.

The method employed is substantially described in Example 1 above. However, after spray deposit is dried, the plants are washed with one inch of simulated rainfall. The plants are then allowed to dry before they are inoculated. Data are recorded in the following table:

Table V

| PQO Treatment at— | Mean Disease Index [1] (Average of four Treatments) | | Phytotoxicity |
|---|---|---|---|
| | Scab | Powdery Mildew | |
| 1,200 p.p.m. | 0.0 | 0.0 | Moderate |
| 600 p.p.m. | 0.0 | 0.25 | Slight |
| 300 p.p.m. | 0.25 | 0.25 | None |
| 150 p.p.m. | 0.0 | 1.5 | Do |
| Acetone/Water Control (50/50) | 5.0 | 5.0 | Do |

[1] Mean Disease Index as defined in Table III above.

EXAMPLE 6

The protective properties of the compounds recited in the table below are tested using scab and powdery mildew of apples.

The method used is that of Example 3 above. The only difference is that the test trees are about 18 inches tall and are most difficult to spray by the method available.

Table VI

| Test Compound | Rate (p.p.m.) | Mean Disease Index [1] (Average of three Treatments) | |
|---|---|---|---|
| | | Scab | Powdery Mildew |
| 9,10-Phenanthrenequinone oxime | 600 | 0.0 | 0.5 |
| | 300 | 0.3 | 1.3 |
| | 150 | 0.8 | 2.3 |
| Sodium salt of 9,10-Phenanthrenequinone oxime | 600 | 0.0 | 2.3 |
| | 300 | 1.3 | 2.0 |
| | 150 | 1.7 | 3.7 |
| 9,10-Phenanthrenequinone dioxime | 600 | 0.3 | 1.0 |
| | 300 | 1.8 | 2.3 |
| | 150 | 2.7 | 3.5 |
| Disodium salt of 9,10-Phenanthrenequinone oxime | 600 | 0.5 | 1.2 |
| | 300 | 1.9 | 2.4 |
| | 150 | 2.8 | 3.7 |
| Acetone/Water Control (50/50) | | 5.0 | 5.0 |

[1] Mean Disease Index as defined in Table III above.

EXAMPLE 7

It can be readily seen that 9,10-phenanthrenequinone monooximes and dioximes are effective fungicides. However, to determine whether they have broad spectrum activity, host plants are inoculated with fungi and treated with 9,10-phenanthrenequinone monooxime as in Example 3 above. Diseases controlled and effective dosages in this example are tabularized as follows:

Table VII

| Disease | Host | Fungus Pathogen | Effective Rate (p.p.m.) |
|---|---|---|---|
| Powdery Mildew | Apple | *Podosphaera leucotricha* (Ell. & Ev.) Salm. | 75-300 |
| Do | Rose | *Sphaerotheca pannosa* (Wallr.) Lev. | 600 |
| Do | Cucumber | *Erysipne cichoracearum* DC. | 300 |
| Do | Bluegrass | *Erysiphe graminis* DC | 600-1,200 |
| | Fescue | do | 600-1,200 |
| | Bentgrass | do | 600-1,200 |
| Scab | Apple | *Venturia inaequalis* (Cke. Wint.) | 75 or less |
| Leaf Spot | Sour Cherry | *Coccomyces hiemalis* Higgins. | 300-600 |
| Anthracnose | Cucumber | *Colletotrichum lagenarium* (Pass.) Ell. & Halst. | 50-100 |
| Leaf Spot | Wheat | *Helminthosporium sativum* Pam. | 100 |
| Fruit Rot | Apple | *Botryosphaeria ribis* Gross & Dug. | 600-1,200 |

EXAMPLE 8

A wettable powder formulation of 9,10-phenanthrenequinone oxime is prepared and evaluated using cucumber anthracnose and apple scab as the test diseases.

The ingredients of the formulation are a mixture of 70 parts 9,10-phenanthrenequinone oxime (PQO), 22 parts kaolin clay, 5 parts silica, 1 part carboxymethylcellulose and 2 parts alkylarylpolyether alcohol blended and milled to an average particle size of 2 microns.

A 70% aqueous solution of the blended wettable powder is next prepared and applied to a host plant previously inoculated following the procedure of Example 2 above. The results are recorded as follows:

*Table VIII*

| Treatment | Rate Actual p.p.m. | Cucumber Anthracnose | | Apple Scab Index [2] Average of 2 treatments |
|---|---|---|---|---|
| | | No. of Lesions [1] | Percent Disease | |
| PQO 70% wettable powder | 500 | 0 | 0 | 0.0 |
| | 100 | 18 | 4.0 | 1.5 |
| | 50 | 34 | 7.6 | 1.0 |
| | 25 | 67 | 14.9 | 2.0 |
| Water Control | | 450 | 100 | 4.0 |
| Acetone/Water Control | | 710 | 100 | 4.0 |

[1] The total number of anthracnose lesions on the primary leaves of 8 replicates cucumber plants per treatment.
[2] Index as defined in Table III above.

We claim:

1. A preparation for the control of fungi and bacteria which comprises: a major amount of an inert fungicidal carrier and minor amounts of (*a*) a phenanthrenequinone oxime selected from the group consisting of 9,10-phenanthrenequinone oxime, 9,10-phenanthrenequinone dioxime and the alkali metal salts thereof and (*b*) a dispersing agent.

2. The preparation according to claim 1, in which the oxime is 9,10-phenanthrenequinone oxime.

3. The preparation according to claim 1, in which the oxime is the sodium salt of 9,10-phenanthrenequinone oxime.

4. The preparation according to claim 1, in which the oxime is 9,10-phenanthrenequinone dioxime.

5. The preparation according to claim 1, in which the oxime is the disodium salt of 9,10-phenanthrenequinone dioxime.

6. A method for the protection of organic materials susceptible to attack by fungi which comprises: applying to said organic material a preparation comprising a major amount of an inert fungicidal carrier and a minor amount of a phenanthrenequinone oxime selected from the group consisting of 9,10-phenanthrenequinone oxime, 9,10-phenanthrenequinone dioxime and the alkali metal salts thereof.

7. A method according to claim 6, in which the preparation is in the form of an aqueous suspension.

8. A method according to claim 7, in which the oxime is 9,10-phenanthrenequinone oxime.

9. A method according to claim 7, in which the oxime is the sodium salt of 9,10-phenanthrenequinone oxime.

10. A method according to claim 7, in which the oxime is 9,10-phenanthrenequinone dioxime.

11. A method according to claim 7, in which the oxime is the disodium salt of 9,10-phenanthrenequinone dioxime.

References Cited in the file of this patent

UNITED STATES PATENTS 2,302,384    Horst _____ Nov. 17, 1942

OTHER REFERENCES

Berichte 16, page 2178 (1883); 40, page 2454 (1907).